Nov. 11, 1924.
G. H. WHITTINGHAM
1,515,232
AUTOMATIC PLUG REVERSE SWITCH
Filed Jan. 26, 1924
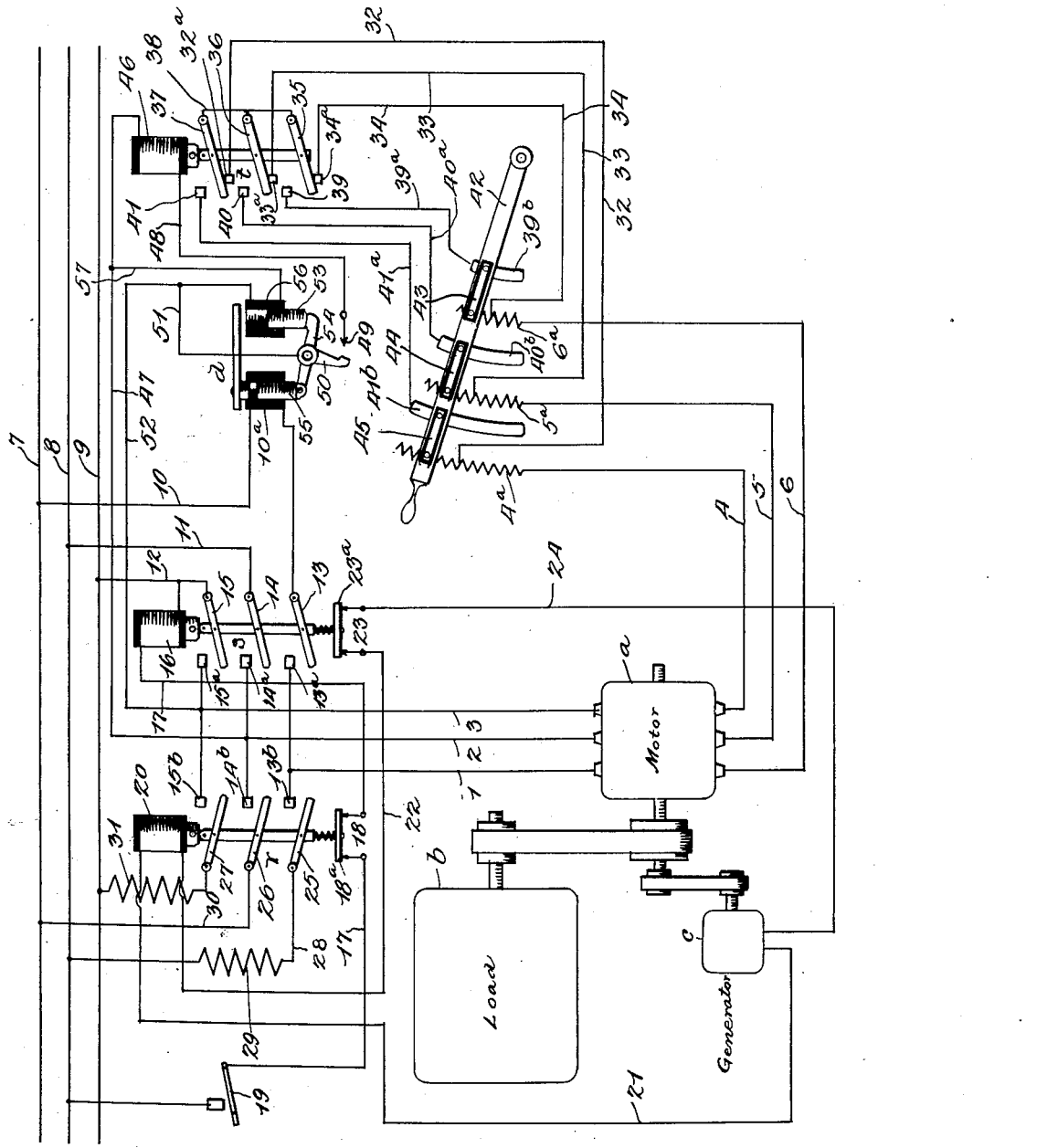
Inventor,
George H. Whittingham.
By Robert Watson
Attorney Patented Nov. 11, 1924.

1,515,232

UNITED STATES PATENT OFFICE.

GEORGE H. WHITTINGHAM, OF BALTIMORE, MARYLAND, ASSIGNOR TO MONITOR CONTROLLER COMPANY, OF BALTIMORE, MARYLAND, A CORPORATION OF MARYLAND.

AUTOMATIC PLUG REVERSE SWITCH.

Application filed January 26, 1924. Serial No. 688,885.

*To all whom it may concern:*

Be it known that I, GEORGE H. WHITTINGHAM, a citizen of the United States, residing at Baltimore, in the State of Maryland, have invented certain new and useful Improvements in Automatic Plug Reverse Switches, of which the following is a specification.

In the use of induction motors of the wound rotor type, when it is desired to stop the rotor, it is customary to apply a braking action to the rotor by reversing the phases of the current in the stator circuits for a few moments through suitable resistances. This has usually been accomplished by temporarily closing a manually controlled switch, termed a plug reverse switch, which must be opened after the rotor has slowed down in order to avoid reversal of the rotor, the time of closure of the switch being thus left to the judgment of the operator.

The purpose of the present invention is to provide means for automatically reversing the phases of the current for a sufficient length of time to apply a braking action to the rotor and for causing the reverse switch to open automatically at or near the time when the rotor comes to a stop.

In carrying out the invention, I provide a main switch for opening and closing the connections between the supply wires and the motor, an electro-magnetically controlled switch, normally open, for reversing the phases of the current in the stator circuits, to apply a braking action to the rotor, and a direct current generator, driven by the motor, for generating a current to energize the magnet of the reverse switch. The circuit of the generator through the magnet of the reverse switch is controlled by the main switch, so that when the latter is closed, said circuit will be opened, and when the main switch is opened, the generator circuit will be closed and the magnet of the reverse switch will be energized, causing the reverse switch to close and effect a reversal of the current phases in the motor, to apply a braking action. As the motor slows down, the voltage of the generator, which is driven by the motor, drops, and the current in the magnet circuit decreases to a point where the magnet will be insufficiently energized to support its core. The reverse switch, controlled by the magnet, then moves to its open position.

I also provide means whereby when the plug reverse switch is closed, the circuit of the magnet of the main switch will be held open, so that the operator cannot cause the two switches to be closed at the same time.

The accompanying drawing shows the invention diagrammatically in association with an alternating current motor, its load and speed controlling mechanism.

Referring to the drawing, $a$ represents a multi-phase motor of the wound rotor type, the leads to the stator being indicated at 1, 2, and 3, and 4, 5, and 6 represent leads from the rotor to the starting and regulating resistances $4^a$, $5^a$, and $6^a$, respectively. The load to be driven by the motor, such as a printing press, is indicated at $b$, and $c$ indicates a small direct current generator also driven by the motor. The main switch for connecting the motor to the supply circuit is indicated at $s$, and $r$ indicates a switch for causing a reversal of the current phases in the stator windings. The supply wires are indicated at 7, 8, and 9, and conductors 10, 11, and 12 lead from these wires to the switch arms 13, 14, and 15, respectively, of the main switch. The conductor 10 leads through the retarding coil $10^a$ of a relay $d$, associated with the speed controlling mechanism hereinafter referred to. The switch arms 13, 14 and 15, are adapted to engage stationary contacts $13^a$, $14^a$, and $15^a$, respectively, when the switch is closed, and these contacts are connected with the stator leads 1, 2, and 3, respectively, as shown. A magnet 16 is provided for closing the main switch and the circuit for the coil of this magnet extends from supply wire 9, through conductor 12 to the coil, thence through conductor 17 and a normally closed switch 18 to a manually operated switch 19, and thence to the supply wire 8. When the switch 19 is closed, the magnet 16 will be energized, providing the switch 18 is closed, and this magnet will cause the switch $s$ to close and the motor will start. When the switch 19 is opened, the current is cut off from the magnet 16 and the main switch $s$ then opens, cutting off the connections between the supply wires and the stator windings of the motor.

The switch $r$ is normally open and a magnet 20 is provided for causing this switch to close. The current for energizing the coil of this magnet is supplied from the small generator $c$ through conductor 21, leading from one terminal of the generator, to the coil, and thence through conductor 22 to a switch 23, associated with the main switch, and thence through conductor 24 to the other terminal of the generator. The switch 23 comprises the bridge-piece $23^a$, which closes the generator circuit when the main switch $s$ is open and which opens said circuit when the main switch is moved to the closed position. Thus, the magnet 20 cannot be energized to close the reverse switch $r$ when the main switch $s$ is closed. The switch $r$ is normally open and in this position the bridge-piece $18^a$ of the switch 18 completes the circuit of the coil 16 of the main switch to a manually controlled switch 19. When the magnet coil 20 is energized, the magnet causes the switch $r$ to close and at the same time to open the switch 18, interrupting the circuit of the coil 16 so that it is impossible for the coil 16 to be energized while the reverse switch is closed. Hence, the switches $r$ and $s$ may be closed alternately but not both at the same time.

The reverse switch $r$ comprises the arms 25, 26, and 27, adapted to engage the stationary contacts $13^b$, $14^b$, and $15^b$, which contacts are connected to the motor leads 1, 2, and 3, respectively. The arm 25 is connected to the supply wire 8, through conductor 28 and resistance 29; the arm 26 is connected to supply wire 7, through conductor 30, and the arm 27 is connected to supply wire 9 through resistance 31. Thus, when the main switch $s$ is closed, the circuits to the leads 1 and 2 of the motor will be to supply wires 7 and 8, respectively, and when the reverse switch $r$ is closed, the circuits from these leads to the supply wires will be reversed, the lead 1 being connected to the supply wire 8 and the lead 2 being connected to the supply wire 7. Hence, the closure of the switch $r$ will reverse the current phases in the stator of the motor.

Conductors 32, 33, and 34 lead from the intermediate portions of the resistances $4^a$, $5^a$, and $6^a$ to stationary contacts $32^a$, $33^a$, and $34^a$ of a switch $t$ which normally short-circuits these conductors. Thus, switch arms 35, 36, and 37, which are connected together by a conductor 38, normally rest on said contacts and electrically connect them together, closing the circuits of the rotor through parts of the resistances $4^a$, $5^a$, and $6^a$, which serve for starting purposes. When these switch arms 35, 36, and 37 are moved away from the aforesaid contacts they engage other contacts 39, 40, and 41, which are connected by conductors $39^a$, $40^a$, and $41^a$, to contact strips $39^b$, $40^b$, and $41^b$, respectively. The pivoted speed regulating arm 42 carries bridge pieces 43, 44, and 45, each engaging one of said contact strips and an adjacent resistance, as shown. When the switch arms of the switch $t$ engage the contacts 39, 40, and 41, they will close the circuits of the rotor through as much of the resistances as is included between the bridge-pieces 43, 44, and 45, and the conductors 6, 5 and 4, respectively.

A magnet 46 is provided for moving the switch $t$ from its normal position, shown in the drawing, to a position where its arms engage the contacts 39, 40, and 41. This magnet is normally de-energized and its circuit is made up through the main switch $s$ and the relay $d$. Thus, the circuit for the magnet 46 leads from supply wire 8 through conductor 11, switch arm 14 and contact $14^a$ of the main switch, to conductor 47, which leads to the coil of the magnet 46, and thence by conductor 48 to the stationary contact 49 of the relay switch; thence through a movable contact arm 50 of said switch and conductor 51 to conductor 52, which is connected to the stationary contact $15^a$ of the main switch. From said latter contact the circuit proceeds through switch arm 15 and conductor 12 to the supply wire 9. Hence, it is only when the main switch is closed and the relay arm 50 is in engagement with the contact 49 that the magnet 46 will be energized. The relay $d$ operates like the mechanism shown in patent to W. C. O'Brien, No. 891,721, dated June 23, 1908. The arm 50 is normally held away from the contact 49 by a solenoid core 53 which rests loosely upon a rocker arm 54, and a lighter solenoid core 55, pivoted to the rocker arm is normally supported in an upper position by the weight of the core 53. The solenoid $10^a$, it will be seen, is always connected in series with the stator windings of the motor when the main switch is closed, and when the motor is being started the current value in the coil of this solenoid is sufficient to sustain the weight of the core 55 after the weighted core 53 has been moved away from the rocker arm. When the current value in the motor circuit falls, then the solenoid $10^a$ will no longer sustain the core 55 and the rocker arm will then move to close the contacts 50 and 49, assuming the weighted core 53 to be lifted from said rocker arm, as it always is, while the main switch is closed. Thus, a solenoid winding 56 surrounds the core 53 and this winding is connected across two of the supply wires whenever the main switch is closed. The circuit for the solenoid extends from the supply wire 9 through conductor 12, switch arm 15, contact $15^a$ and conductor 52 to one terminal of the coil, and thence by conductor 57, which is connected through conductor 47 and contact 14ᵃ, switch arm 14 and conductor 11 to supply wire 8.

The operation of the invention is as follows: In order to start the motor the manually controlled switch is closed and this completes a circuit through the solenoid 16 of the starting switch, causing the arms on said switch to connect the stator windings of the motor with the supply wires and at the same time interrupting the circuit of the smaller generator $c$ at the switch 23. The rotor windings are at this time short-circuited through fixed portions of the resistances sufficient for starting purposes. The coil 10ᵃ of the relay, which is in one leg of the stator circuits, will be strongly energized while the motor is starting and the core 53 of the relay will be lifted by the coil 56 the moment the main switch is closed. When the starting current decreases to a predetermined value, the coil 10ᵃ will release its core and the switch composed of the arm 50 and contact 49 will close, thereby causing the solenoid 46 to be energized. The latter will immediately lift its core, opening the circuits through conductors 32, 33, and 34, and connecting the bridge-pieces of the speed regulating arm together so that after the motor has started, it will run at a pre-set speed, determined by the position of this arm with respect to the resistance contacts.

When it is desired to stop the motor, the manually controlled switch 19 is opened and this causes the magnet of the main switch to be de-energized. The core of the magnet drops, disconnecting the stator windings of the motor from the supply wires and closing the circuit of generator $c$ at the switch 23. Current from the generator then flows through the coil of the magnet 20 of the reverse switch and this magnet causes said switch to close, thereby reversing the current phases in the stator windings, which gives a strong braking action on the motor. As the motor slows down, the electromotive force of the generator, which is driven by the motor, decreases accordingly and the current in the coil of the magnet 20 decreases to a point where said magnet will no longer support its core. Thereupon, the reverse switch moves automatically to open position, by gravity. It is to be noted that while the reverse switch is closed, the circuit for the magnet 16 of the main switch is open, so that the operator cannot cause the main switch to be closed while the current phases are reversed in the motor. It is also to be noted that the generator operates on an open circuit while the main switch is closed, and that when the main switch opens the generator circuit is automatically closed. The opening of the main switch also cuts off the supply of current to the relay solenoids and also to the magnet 46 which controls the switch $t$, so that the motor switch and the relay switch are restored to their normal positions.

What I claim is:

1. The combination with an induction motor and a main switch for connecting the stator windings thereof to the supply circuit, of a direct current generator driven by the motor, a switch for reversing the current phases in the motor, a magnet, having a coil in circuit with the generator, for closing the latter switch, and means for closing the circuit through said coil when the main switch opens.

2. The combination with an induction motor and a main switch for connecting the stator windings thereof to the supply circuit, of a direct current generator driven by the motor, a switch for reversing the current phases in the motor, a magnet, having a coil in circuit with the generator, for closing the latter switch and means, controlled by the main switch, for closing the circuit through said coil when the main switch opens.

3. The combination with an induction motor, a main switch for connecting the stator-windings thereof to the supply circuit, a magnet for closing said switch and a manually controlled switch for closing the circuit of said magnet, of a direct current generator driven by the motor, a switch for reversing the current phases in the motor, a magnet for closing the latter switch and having a coil in circuit with the generator, means for automatically closing the latter circuit when the main switch is opened, and means controlled by the magnet of the reverse switch for opening the circuit of the magnet of the main switch when the reverse switch is closed.

In testimony whereof I hereunto affix my signature

GEORGE H. WHITTINGHAM.